United States Patent Office 3,692,605
Patented Sept. 19, 1972

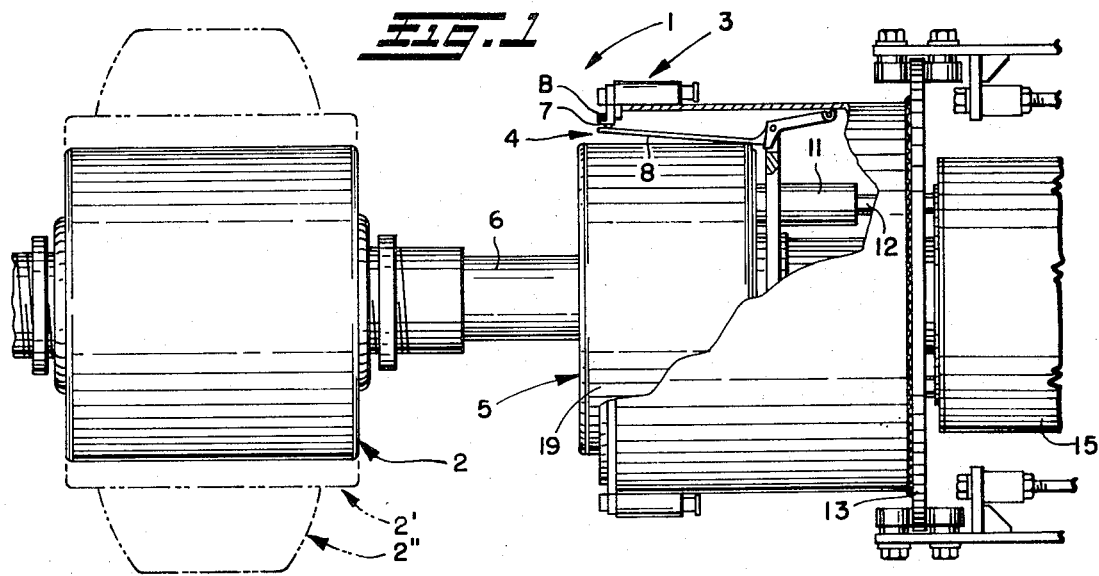
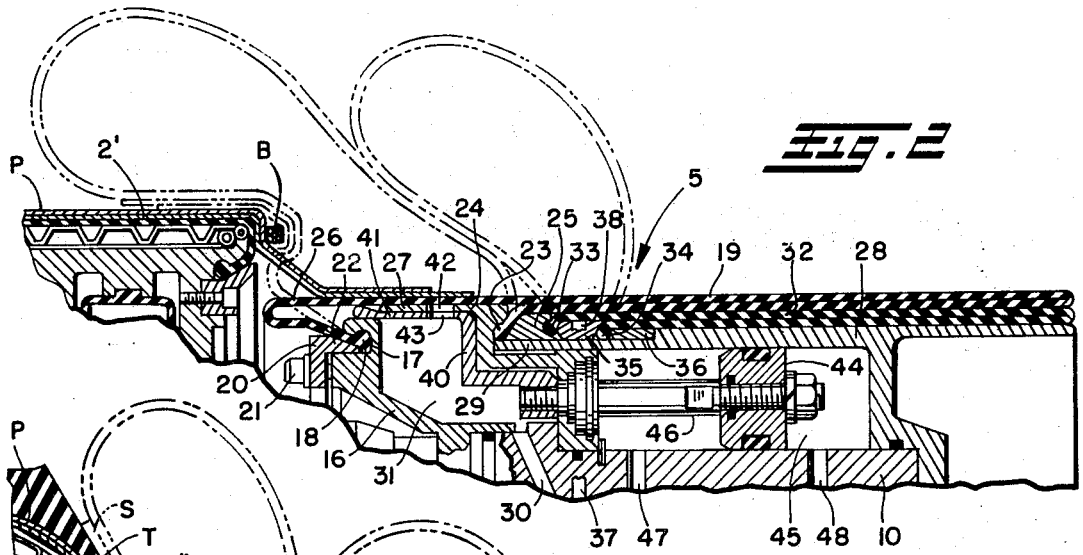
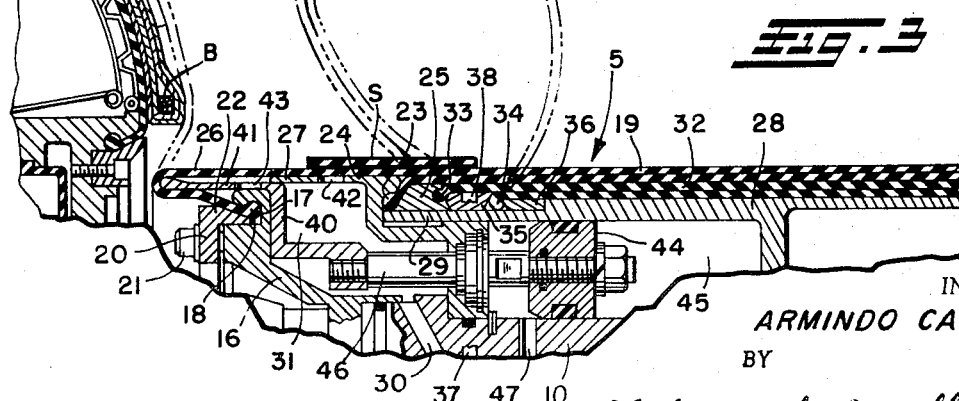
INVENTOR.
ARMINDO CANTARUTTI
BY
Oberlin, Maky, Donnelly & Renner
ATTORNEYS

3,692,605
PLY TURN-UP AND SIDE WALL APPLYING BLADDER FOR TIRE BUILDING MACHINE AND METHOD
Armindo Cantarutti, Akron, Ohio, assignor to NRM Corporation, Akron, Ohio
Filed July 22, 1970, Ser. No. 57,043
Int. Cl. B29j 17/20, 17/22
U.S. Cl. 156—132    18 Claims

ABSTRACT OF THE DISCLOSURE

Ply turn-up and side wall applying mechanism includes an inflatable bladder having a folded or looped inner marginal portion adapted to be positioned adjacent the ends of a tire building drum, and an annular insert axially movable within the bladder between a retracted position permitting freedom of movement of the inner marginal portion for proper ply turn-up and an extended position restricting such movement for accurate placement of the side wall material on the tire during inflation of the bladder.

BACKGROUND OF THE INVENTION

This invention relates generally as indicated to a ply turn-up and side wall applying mechanism for tire building machines, and more particularly, to certain improvements in such mechanism to facilitate more accurate placement of the tire side wall material onto the tire carcass without affecting the ply turn-up operation.

In the manufacture of tires and particularly radial tires, it is generally known to use the same mechanism for both ply turn-up and placement of the side wall material onto the tire carcass. As an example of such a mechanism, reference may be had to applicant's copending U.S. application Ser. No. 642,067, filed May 29, 1967, now U.S. Pat. No. 3,560,301, granted Feb. 2, 1971, which is incorporated herein by way of reference. In such copending application, the ply turn-up mechanism comprises two expansible cooperating air bags or bladders which when brought into proper position at the end of tire building drum and inflated cause the previously turned down ply material too be turned about the bead ring and firmly pressed or stitched in place. Afterwards, the ends of the drum are moved toward each other during expansion of the tire carcass to the proper toroidal shape and the belt and tread stock are applied thereto. The side wall material is then placed on the dual bag turn-up mechanism when deflated and the bags are expaned, which automatically positions the material onto the carcass and fimly presses the material in position, thus avoiding manual operations and insuring greater precision in tire construction.

The only drawback in using such a ply turn-up mechanism for placement of the side wall material is that the folded or looped inner marginal portion of the bag which permits relative sliding movement between the bag and drum during expansion of the bag for effective turn-up of the tire plies about the beads may result in improper placement of the side wall material on the tire carcass during a subsequent operation, causing tire imbalance and faulty appearance.

SUMMARY OF THE INVENTION

With the foregoing in mind, it is a principal object of this invention to provide an improved ply turn-up and side wall applying mechanism which may be used both for effective ply turn-up and accurate placement of the side wall material on the tire.

These and other objects of the present invention may be achieved by providing the ply turn-up and side wall applying mechanism with an annular insert which is axially movable within the bladder between a retracted position permitting unobstructed movement of the folded inner marginal portion of the bladder during ply turn-up and an extended position projecting into the folded inner marginal portion for restricting its movement during application of the side wall material to the tire carcass by inflation of the bladder.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary side elevation view of one end of a tire building machine embodying a preferred form of ply turn-up and side wall applying mechanism constructed in accordance with this invention:

FIG. 2 is an enlarged fragmentary longitudinal section through the ply turn-up and side wall applying mechanism of FIG. 1 shown in position adjacent one end of the tire building drum with the axially movable insert within the bladder in the retracted position where it will not interfere with movement of the folded inner marginal portion of the bladder during inflation for obtaining proper ply turn-up; and FIG. 3 is an enlarged fragmentary longitudinal section similar to FIG. 2 but showing the insert within the bladderin its extended position projecting into the folded inner margin portion of the bladder for restricting movement of such folded inner marginal portion during inflation for obtaining accurate placement of side wall material onto the tire carcass.

DESCRIPTION OF THE PREFERRED EMBODIMENTS

Referring now in detail to the drawings and first especially to FIG. 1, there is illustrated a portion of a tire building machine 1 for making radial tires which may be of a type generally similar to that shown in applicant's aforementioned U.S. application 642,067, now U.S. Pat. No. 3,560,301, granted Feb. 2, 1971, including an expansible tire building drum 2 having a bead setting device 3, ply turn-down device 4, and ply turn-up and side wall applying mechanism 5 associated with each end of the drum. Since these same parts are associated with both ends of the drum, only those parts associated with the right end of the drum are shown. Neither the drum 2 per se nor the bead setting device 3 and ply turn-down device 4 forms any part of the present invention and accordingly they will not be described in detail. However, they may be of a construction similar to that shown in the aforementioned copending application Ser. No. 642,067, and reference may be had to such application for a complete description of their construction and operation.

With respect to the tire building drum 2, it is sufficient to say that the drum is mounted on the shaft 6 for rotation, and suitable mechanisms are provided for expanding the drum first to the enlarged cylindrical configuration 2' shown in phantom lines in FIG. 1 for proper placement of the tire plies P on the drum during rotation thereof with the edges of the plies overhanging the ends of the drum, and then to the toroidal shape 2" also shown in phantom lines in FIG. 1 which is obtained by expanding the center of the drum while simultaneously moving the ends of the drum axially inwardly toward each other. Prior to expanding the drum to toroidal shape, the ply turn-down devices 4 are moved into position adjacent the ends of the drum and the bead setting rings 7 are moved axially towards the ends of the drum, causing the ply-down fingers 8 to pivot radially inwardly for turning the overhanging portions of the tire plies P radially inwardly over the ends of the drum. Continued axial movement of the bead setting rings 7 toward the ends of the drums causes the tire beads B to be set against the turned down plies P as shown in FIG. 2, after which the plies are caused to be turned about the beads and up over the top of the drum for stitching of the plies together utilizing the ply turn-up and side wall applying mechanism 5 of the present invention to be described in detail hereinafter.

The ply turn-up and side wall applying mechanism 5 desirably consists of an annular hub portion 10 axially slidably received on the shaft 6 and keyed to the shaft for rotation therewith. Axial movement of the hub portion is obtained by actuation of a plurality of circumferentially spaced cylinders 11 connected to the hub portion. The rods 12 for the cylinders 11 are secured to the main support plate 13 for the bead setting device 3, and selected ones of the rods 12 contain passages therein providing communication between the valve block 15 and opposite ends of the cylinders 11 for effecting axial movement of the hub portion 10 toward and away from the adjacent end of the drum as in such copending U.S. application Ser. No. 642,067.

Attached to the annular hub portion 10 adjacent the axial inner end thereof is a radially extending plate 16 having an axially inwardly opening annular groove 17 in which is retained one of the beads 18 of an annular air bag or bladder 19 using a wedge ring 20 secured to the plate 16 by suitable fasteners 21 and having a beveled flange 22 extending into the annular groove. The other bead 23 of the inflatable bladder 19 is secured between a second annular plate 24 and wedge ring 25 positioned axially outwardly of the first plate. As clearly shown in FIG. 2, the annular bladder 19 when deflated is substantially flat and has a folded or looped inner marginal portion 26 which is located radially inwardly of the tire bead B when the ply turn-up and side wall applying mechanism 5 is moved into position adjacent the end of the drum 2. For supporting the annular bladder 19 in such flattened condition, the plate 24 has a cylindrical portion 27 surrounding the clearance space between the two plates 16 and 24, and an outer shell or support 28 is also provided around the hub portion 10 for supporting the annular bladder 19 in such flattened condition. The outer shell has a reduced outer diameter portion at its axial inner end 29 for receipt of the wedge ring 25. During ply turn-down, the projecting edges of the plies P are turned down over the ends of the drum 2 and pressed against the outer surface of the deflated bladder 19 which supports such edges substantially horizontally as shown with the looped inner marginal portion 26 of the bladder extending axially inwardly to a position closely adjacent the end of the drum.

After the ply edges have been turned down and the beads B have been properly set, the bead setting device 3 and ply turn-down device 4 are retracted to provide sufficient clearance to permit inflation of the annular bladder 19 for ply turn-up. Air is supplied to the bladder 19 in any convenient manner, as by providing a passage 30 in the hub 10 communicating with the clearance space 31 between the bead clamping plates 16 and 24 and suitably connected to an air supply. As the bladder 19 is inflated, the turned-down ply edges are progressively turned about the bead B and the bladder 19 is caused to roll over the outer diameter of the drum 2 for pressing the edges of the plies against the outer surface of the drum either by inflation of a second annular bladder 32 or by use of a pusher ring, not shown.

If a second bladder 32 is used for that purpose, it is disposed radially inwardly of the first bladder 19 and lies flat therebeneath when both bladders are deflated as shown. Its beads 33 and 34 may be secured in place by an annular ring 35 disposed between the wedge ring 25 and another ring 36 on the reduced outer diameter portion 29 of the outer shell 28. Suitable passages 37 and 38 are provided in the mechanism for supplying air to the second bladder 32. Due to the natural tendency of the bladders 19 and 32 to center with respect to their beads during inflation, the inner bladder 32 moves axially toward the adjacent end of the drum 2, causing the outer bladder 19 to roll onto the outer surface of the drum and firmly press and stitch the plies together in that region.

The looped inner marginal portion 26 of the outer bladder 19 also permits limited relative sliding movement of the outer bladder over the end of the drum and turned-up plies during inflation of the bladder for achieving more effective ply turn-up free of wrinkles and distortion. However, such relative sliding movement is not desirable during placement of the side wall material using the ply turn-up and side wall applying mechanism 5 since it may result in inaccurate placement of the side wall material, causing tire imbalance and faulty appearance.

To eliminate such relative sliding movement between the outer bladder and end of the drum during side wall placement, an annular insert 40 is disposed within the clearance space 31 between the clamping plates 16, 24. The insert 40 has an axially inwardly extending flange portion 41 which is axially movable between the plates 16, 24 from a retracted position adjacent the inner marginal portion 26 of the outer bladder 19 as shown in FIG. 2 to an extended position protruding into the inner marginal portion 26 as shown in FIG. 3, and is guided during such movement by the cylindrical portion 27 of plate 24. When the insert 40 is retracted as shown in FIG. 2, the inner marginal portion 26 of the outer bladder 19 is free to move radially outwardly relative to the drum during inflation of the bladder for obtaining effective turn-up of the plies as previously described. However, when the insert 40 is fully extended into the inner marginal portion 26 as shown in FIG. 3, the insert restricts movement of the bladder margin 26 so that the distance between the bladder margin 26 and the side wall material S wrapped about the bladder 19 when deflated remains the same during inflation of the bladder for accurate placement of the side wall material against the tire carcass T after the drum has been expanded to the toroidal shape 2'' shown in FIG. 3 and the belt and tread stock have been applied to the carcass. The inner bag 32 may also be inflated to assist in pressing the side wall material against the carcass, or a pusher ring may be used for that purpose. Suitable openings 42 and 43 in the plate 24 and insert 40 provide communication between the interior of the outer bladder 19 and clearance space 31 between plates 16 and 24 to permit inflation and deflation of the outer bladder for all positions of the insert.

Axial movement of the insert 40 between such retracted and extended positions shown in FIGS. 2 and 3 may be accomplished in any convenient manner, as by providing a ring-shaped piston 44 within a ring-shaped chamber 45 between the hub 10 and outer shell 28, and a plurality of circumferentially spaced rods 46 extending between the annular ring 44 and insert. By alternately venting and pressurizing opposite ends of the annular chamber 45 through ports 47 and 48 in the hub portion 10, the annular ring 44 and insert 40 will be caused to move back and forth.

After the side wall material has been accurately located on the tire by inflation of the bladders 19 and 32, the bladders are deflated to permit further stitching of the side wall material if desired and the drum 2 is collapsed back to the full line position shown in FIG. 1 to permit removal of the now formed carcass from the drum.

From the foregoing, it will now be seen that the ply turn-up and side wall applying mechanism of the present invention may be used for both effective ply turn-up and accurate placement of the side wall material by permitting free movement of the folded inner marginal portion of the bladder during ply turn-up and restricting such movement during application of the side wall material.

I, therefore, particularly point out and distinctly claim as my invention:

1. A ply turn-up mechanism for a tire building machine comprising an inflatable annular bladder, means for supporting said bladder adjacent an end of a tire building drum, said bladder when deflated having an inner marginal portion adapted to be disposed adjacent an end of such drum, means for inflating said bladder, said inner marginal portion of said bladder being radially outwardly movable during inflation of said bladder, and restricting means selectively applied to and removed from said inner marginal portion for selectively restricting and permitting such radial outward movement of said inner marginal portion during inflation of said bladder.

2. The machine of claim 1 further comprising means for supporting said bladder in a substantially flat condition when deflated, and means for applying an axial force to said bladder when inflated.

3. The mechanism of claim 1 wherein said restricting means comprises an insert contained within said bladder, and means mounting said insert for axial movement within said bladder between a retracted position adjacent said inner marginal portion permitting freedom of movement of said inner marginal portion during inflation and an extended position projecting into said inner marginal portion restricting such movement.

4. The mechanism of claim 3 wherein said insert has an axial flange portion which is moved into and out of engagement with said inner marginal portion of said bladder during extension and retraction of said insert.

5. The mechanism of claim 3 wherein said means mounting said insert for axial movement comprises an annular ring-shaped piston contained in a ring-shaped chamber in said bladder, rods interconnecting said insert and piston, and means for selectively pressurizing and venting opposite ends of said chamber for effecting axial movement of said piston and insert connected thereto.

6. The mechanism of claim 3 wherein said means for supporting said bladder adjacent an end of such drum comprises a hub portion, a pair of axially spaced apart plates having grooves therein, said bladder having a pair of beads received in said grooves, and wedge rings for securing said beads within said grooves, said insert being contained within the clearance space between said plates.

7. The mechanism of claim 6 wherein the axial outer one of said plates has a cylindrical portion surrounding such clearance space between said plates, and said insert has an axially extending portion which is guided by said cylindrical portion and extends axially inwardly of the axial inner one of said plates when in the extended position.

8. The mechanism of claim 7 further comprising an outer shell surrounding said hub portion which cooperates with said cylindrical portion of said axial outer plate to support said bladder in a flattened condition when deflated.

9. The mechanism of claim 8 wherein there is a ring-shaped chamber between said hub portion and outer shell containing a ring-shaped piston, said piston having a plurality of rods connected to said insert for effecting axial movement of said insert during axial movement of said piston.

10. A tire building machine comprising an expansible drum adapted to receive tire plies wrapped therebout with the edges of the plies extending beyond the ends of the drum, means for expanding said drum, means for turning the ply edges down over one end of said drum and placing a tire bead thereagainst, and a ply turnup and side wall applying mechanism comprising an inflatable annular bladder, means for supporting said bladder adjacent said one end of said drum, said bladder when deflated having a folded axial inner marginal portion adapted to be disposed adjacent said one end of said drum, means for inflating said bladder, said folded axial inner marginal portion of said bladder being radially outwardly movable during inflation of said bladder, and restricting means selectively applied to and removed from said axial inner marginal portion for selectively restricting and permitting such radial outward movement of said axial inner marginal portion during inflation of said bladder.

11. The machine of claim 10 wherein said means for selectively restricting such radial outward movement of said axial inner marginal portion comprises an insert contained within said bladder, and means mounting said insert for axial movement within said bladder between a retracted position adjacent said inner marginal portion permitting radial outward movement of said inner marginal portion during inflation of said bladder for effective ply turn-up and an extended position projecting into said inner marginal portion restricting such movement during inflation for obtaining accurate placement of side wall material with respect to the drum, such side wall material having been applied to the bladder when deflated, and said drum having been expanded to toroidal shape prior to placement of the side wall material.

12. The machine of claim 11 further comprising means mounting said ply turn-up and side wall applying mechanism for axial movement toward and away from said one end of said drum, and means for rotating said ply turn-up and side wall applying mechanism during application of side wall material thereto.

13. The machine of claim 12 wherein said means mounting said ply turn-up and side wall applying mechanism for axial movement comprises a hub portion, a pair of axially spaced apart plates secured to said hub portion, said axially spaced apart plates having grooves therein, said bladder having a pair of beads received in said grooves, and wedge rings for securing said beads within said grooves, said insert being contained within the clearance space between said plates.

14. The machine of claim 13 wherein the axial outer one of said plates has a cylindrical portion surrounding such clearance space between said plates, and said insert has an axially extending portion which is guided by said cylindrical portion and extends axially inwardly of the axial inner one of said plates when in the extended position.

15. A method of turning up the edges of tire plies which have been turned down over the end of a tire building drum with a tire bead placed thereagainst and placing the side wall material against the tire plies using an inflatable bladder having a folded axial inner marginal portion positioned radially inwardly of the bead adjacent the end of the drum comprising the steps of inflating the bladder to cause the turned-down ply edges to be turned about the tire bead, and during such inflation causing radial outward movement of the inner marginal portion of the bladder to obtain relative sliding movement between the bladder and turned-up plies for obtaining more effective ply turn-up, deflating the bladder, applying the side wall material to the bladder when deflated, and subsequently inflating the bladder while restricting such radial outward movement of the inner marginal portion of the bladder so that the distance between the bladder margin and side wall material remains substantially unchanged during inflation for accurate placement of the side wall material against the tire plies.

16. The method of claim 15 wherein an insert contained within the bladder is extended into the inner marginal portion of the bladder to restrict movement thereof during side wall placement and is retracted to a position adjacent the inner marginal portion to permit radial outward movement of the inner marginal portion during turn-up of the plies.

17. The method of claim 15 further comprising the step of forcing the bladder axially inwardly toward the drum during, or following, inflation to press the turned-up plies and side wall material in place.

18. The method of claim 15 wherein the drum is expanded to cylindrical shape prior or ply turn-up, and is expanded to toroidal shape prior to placement of the side wall material against the tire plies.

References Cited

UNITED STATES PATENTS

| | | | |
|---|---|---|---|
| 2,567,064 | 9/1951 | Frazier | 156—132 |
| 3,171,769 | 3/1965 | Henley et al. | 156—401 X |
| 3,127,294 | 3/1964 | Porter | 156—401 X |
| 3,560,301 | 2/1971 | Cantarutti | 156—401 |

FOREIGN PATENTS

| | | | |
|---|---|---|---|
| 930,801 | 7/1963 | Great Britain | 156—401 |

ROBERT F. BURNETT, Primary Examiner

C. B. COSBY, Assistant Examiner

U.S. Cl. X.R.

156—133, 135, 398, 401, 403, 415, 416